July 22, 1952  H. E. HERMANN ET AL  2,604,003
HEADLIGHT TESTER

Filed Oct. 28, 1949　　　　　　　　　　　　3 Sheets—Sheet 1

Inventors:
Henry E. Hermann
Raymond S. Krause
By Lee J. Gary Atty.

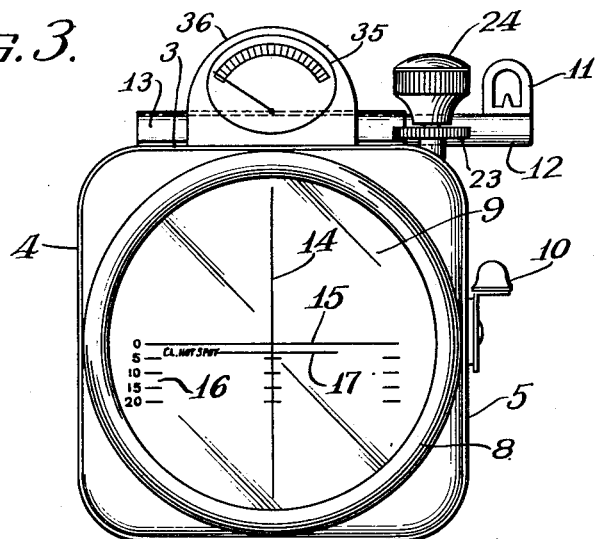
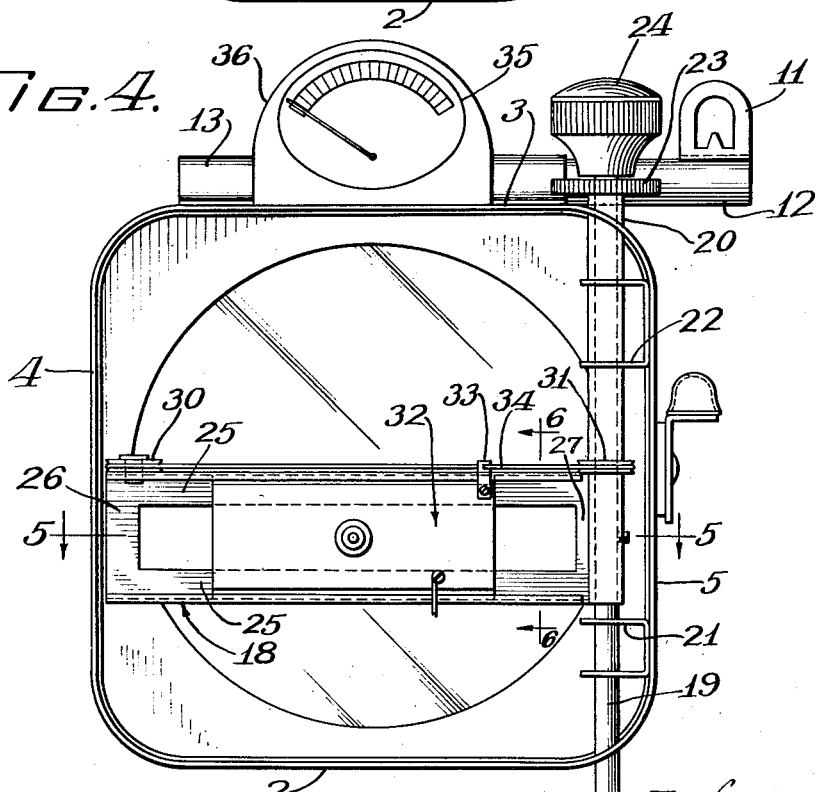

July 22, 1952  H. E. HERMANN ET AL  2,604,003
HEADLIGHT TESTER

Filed Oct. 28, 1949  3 Sheets-Sheet 3

Inventors:
Henry E. Hermann
Raymond S. Krause
By Lee J. Gary, Atty.

Patented July 22, 1952

2,604,003

UNITED STATES PATENT OFFICE 2,604,003

HEADLIGHT TESTER

Henry E. Hermann, Moline, and Raymond S. Krause, Rock Island, Ill., assignors to Bear Manufacturing Company, Rock Island, Ill., a corporation of Delaware Application October 28, 1949, Serial No. 124,122

7 Claims. (Cl. 88—14)

This invention relates to improvements in an automobile headlight testing device and refers particularly to a headlight testing device by which the axis of greatest intensity of a beam from a headlight under test may be simultaneously located electrically by a maximum reading upon an electric meter and visually upon a calibrated screen.

Headlight testers have heretofore been proposed for focusing the beam of a headlight under test upon a calibrated translucent screen and depending upon visual observation of the position of the most intensive portion of the beam or "hot spot" upon the screen the headlight may be adjusted to properly orient the hot spot upon the screen.

In so locating the hot spot upon the screen visual appraisal of the most intensely illuminated area of the screen was necessary. The possibility of error in this regard is apparent since identification of the most intensely illuminated area of the screen is always subject to the human equation.

Light sensitive devices such as photoelectric cells have heretofore been employed in testing headlights, but said devices were principally used to determine quantitatively the illuminating power of the headlight in candlepower, lumens, or other arbitrarily conceived units.

In our invention, the area of greatest intensity or hot spot may be simultaneously appraised as the hot spot and located upon a calibrated screen, the appraisal being accomplished electrically and without appreciable error.

Other objects and advantages of our invention will be apparent from the accompanying drawings and following detailed description.

In the drawings, Fig. 1 is a top plan view, parts being broken away and parts being shown in section, of our improved headlight tester.

Fig. 3 is a rear elevational view of the device illustrated in Figs. 1 and 2.

Fig. 4 is a transverse sectional view taken on the line 4—4 of Fig. 2.

Figure 1:
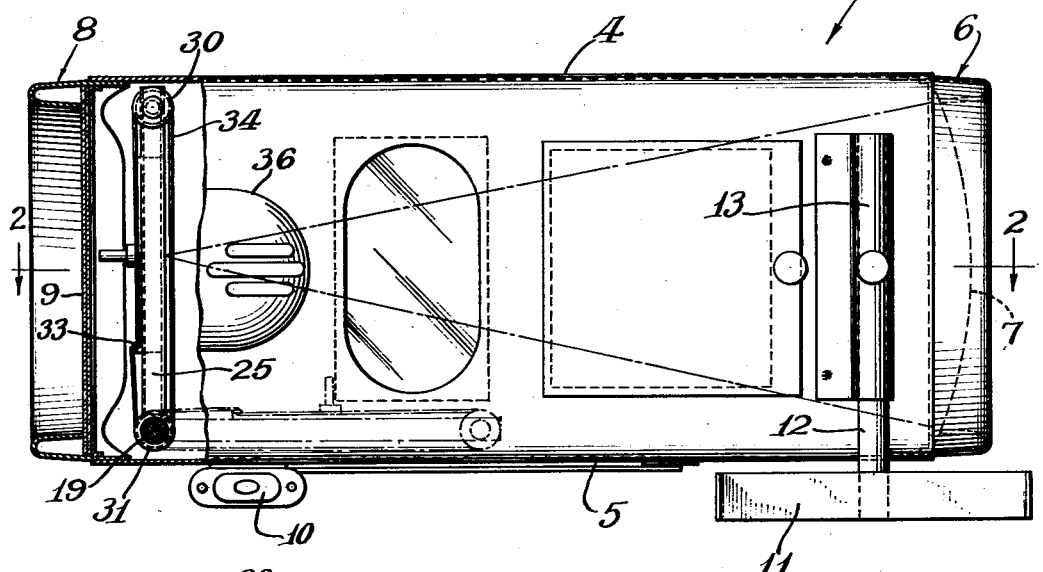
Figure 2:
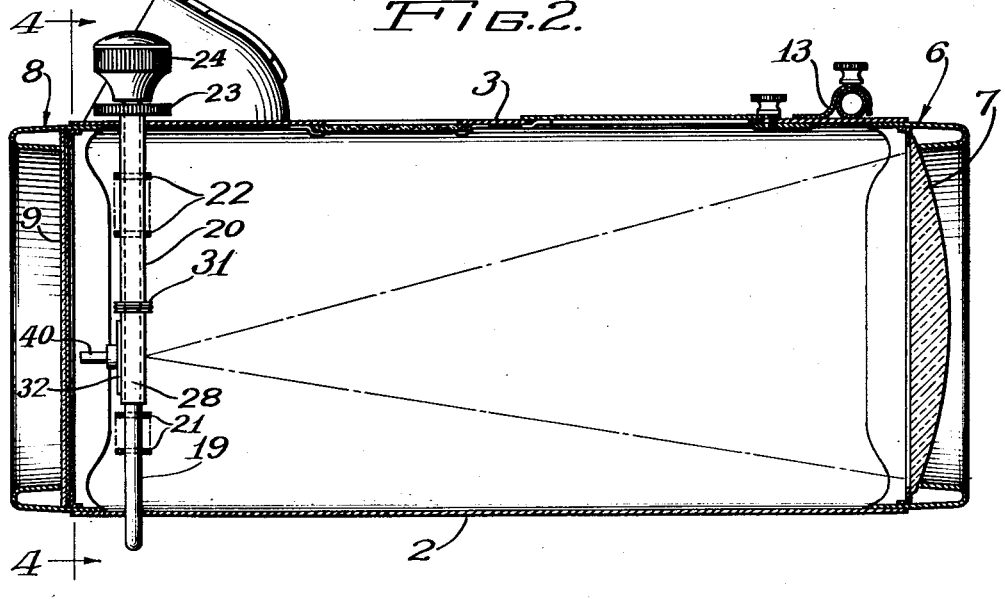
Fig. 2 is a longitudinal sectional view taken on line 2—2 of Fig. 1.

Referring in detail to the drawings, 1 indicates generally a headlight tester comprising the features of our invention. The headlight tester 1 comprises a tubular member of substantially square cross section having bottom wall 2, top wall 3 and side walls 4 and 5. The walls 2–5 may be constructed of any suitable material, preferably sheet material. At the forward end of the headlight tester 1 a frame 6 is positioned, said frame being adapted to retain a plano-convex lens 7. At the rear portion of the headlight tester 1 a frame 8 carries a translucent screen 9 which preferably comprises ground or opal glass.

In utilizing our headlight tester, the same may be mounted upon a suitable support, not shown, and the device may be positioned a predetermined distance away from the lens of a headlight to be tested, the optical axis of the lens 7 being disposed along the optical axis of the headlight lens. The headlight tester 1 carries at one side a spirit level 10 which may be employed in orienting the headlight tester with respect to the headlight to be tested. In addition, an aligning device 11 may be employed in properly orienting the headlight tester with the headlight to be tested, the aligning device being carried upon a rod 12 which is adjustably positioned in sleeve 13 carried at the top of the headlight tester.

The structural features of the device 1 hereinbefore described are conventional and per se do not constitute any part of our present invention except in combination with the elements which will be hereinafter more fully described.

In utilizing a headlight tester such as has been hereinbefore described after the device has been aligned properly with the headlight to be tested, the headlight bulb is illuminated and the rays projected by the headlight pass through the lens 7 and in the construction of headlight testers heretofore devised said rays are brought to a focus at or adjacent the translucent screen 9. The screen 9 is provided with cross hairs 14 and 15 and additional calibrations 16. The cross hairs 14 and 15 are positioned along the optical axis of the lens 7 and along the longitudinal axis of the headlight tester 1. In adjusting the headlight tester 2, the optical axis of the headlight to be tested would also be disposed along this same axis. The focusing of headlights, particularly automobile headlights, is usually dictated by state regulations and in most cases the regulations provide that the most intense portion of the beam of the headlight be depressed beneath the optical axis of the headlight. Accordingly, an index line 17 may be inscribed upon the translucent screen 9 which locates the depressed position of the most intense portion of the beam, namely the hot spot of the beam.

As has been hereinbefore described, the beam is focused substantially in the plane of the translucent screen 9 and in employing headlight testers heretofore the position of the hot spot of the beam was visually located upon the screen 9 with reference to the various index lines 14, 15, 17 and the calibrations 16. If the hot spot of the beam were appreciably remote from the line 17 proper adjustment of the headlight was in order. However, to locate properly the hot spot, a visual appraisal of what area constitutes the hot spot has heretofore been necessary. It can readily be seen that the human equation enters into this factor and is a source of error.

As a feature of our invention a frame 18 is carried within the body of the headlight tester, said frame being normally disposed adjacent and in plane parallel relationship with the translucent screen 9. The frame 18 is carried by a rod 19 which is journalled in the lower portion of the headlight tester body. The upper portion of the rod 19 is loosely embraced by a tubular member 20, said tubular member being journalled for longitudinal movement and rotary movement in the upper portion of the headlight tester 5. A guide 21 carried by side wall 5 of the headlight tester body also constitutes a bearing for the rod 19, the rod being longitudinally and rotatably positioned within the guide 21. Similarly a guide 22 is mounted upon the inner surface of wall 5 and functions as a bearing member for the tube 20. Exteriorly of the headlight tester casing a knurled disc 23 is positioned upon the projecting end of tube 20, said disc being immovably positioned with respect to said tube. Upon the projecting end of the upper portion of rod 19 a knob 24 is carried whereby the rod may be raised upwardly or moved downwardly or rotated.

Figure 5:
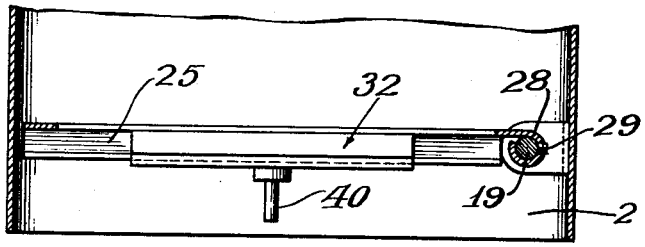
Fig. 5 is a detailed sectional view of the photoelectric cell carrier frame taken on line 5—5 of Fig. 4.
Figure 6:
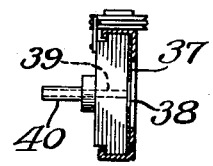
Fig. 6 is a transverse sectional view taken on line 6—6 of Fig. 4.

The frame 18 comprises an opposed pair of channel members 25 and end members 26 and 27. The end member 27 terminates in a sleeve 28 (Fig. 5) which embraces an intermediate portion of rod 19 and is rigidly secured to said rod by means of set screw 29.

The upper channel member 25 carries at one end a sheave 30 and at the opposite end a sheave 31 is carried upon the lower edge of the tube 20. The sleeve 28 is positioned upon rod 19 so as to align the grooves of the sheaves 30 and 31. A photoelectric cell 32 is slidably positioned in the frame 18 being retained by the opposite facing channel members 25. A lug 33 is secured at one corner to the photoelectric cell and the extending end of said lug is attached to a cable 34 which is trained around the sheaves 30 and 31.

The arrangement is such that by rotating the knurled disc 23 sheave 31 is rotated and the cable 34 is moved longitudinally in one direction or the other parallel to the channels 25. In this fashion the photoelectric cell 32 may be carried longitudinally with respect to said channel members and hence the photoelectric cell may be positioned in a variety of locations transverse of the body of the headlight tester. In addition, rod 19 may be raised or lowered by manipulating knob 24 to raise or lower the frame 18 and accordingly raise or lower the photoelectric cell 32 within the interior of the headlight tester casing. In addition, if so desired the knob 24 may be rotated whereby the frame 18 may be swung from its transverse position within the casing to a position wherein it is parallel and adjacent to the wall 5.

Photoelectric cell 32 is of conventional construction except as hereinafter noted and is of the type that generates its own voltage when a light impinges upon the activated surface thereof. The photoelectric cell is connected by suitable leads (not shown) to an electric meter 35 which is positioned in housing 36 carried upon the upper wall 3 of the headlight tester. As a feature of our invention an opaque coating or layer 37 is positioned over the active surface of the photoelectric cell 32 except at a circular exposed area 38 at the center of the photoelectric cell. Concentrically disposed and of lesser cross sectional area an opening 39 is provided transversely through the photoelectric cell, said opening connecting with an open tube 40 which is positioned upon the rear or inactive face of the photoelectric cell. In utilizing the invention light is caused to impinge upon the active face of the photoelectric cell and a portion of said light is projected through the opening 39 through the cell and the concentric or coaxial opening in the tube 40, that is, the light will be channelled through the opening in the tube. The length of the tube 40 is such as to dispose its rear open end adjacent the inner surface of the screen 9 whereby a minimum of dispersion occurs between the end of the tube and the screen. Consequently, when light impinges upon the exposed area 38 of the photoelectric cell a portion of said light will be projected through the opening 39 and will impinge upon the rear face of the screen 9.

In utilizing our invention, the headlight tester is positioned in front of the headlight to be tested in the manner hereinbefore described. The light from the headlight passes through the lens 7 and is focused at substantially the plane of the photoelectric cell. To locate the hot spot of the light so focused the photoelectric cell 32 is moved transversely and vertically by means of the knurled disc 23 and knob 24 until a maximum reading is obtained upon the meter 35. This indicates that the exposed circular area 38 of the photoelectric cell 32 is substantially in concentric relationship to the axis of the most intensive portion of the beam. At this position the meter 35 will give its maximum deflection. Having thus appraised the hot spot of the beam electrically a small pencil of light is projected through the opening 39 in the photoelectric cell and this pencil of light impinges upon the screen 9 in a more or less concentrated spot. Thus the electrically appraised hot spot can be visually located upon the calibrated screen 9 with a high degree of accuracy.

Figure 7:
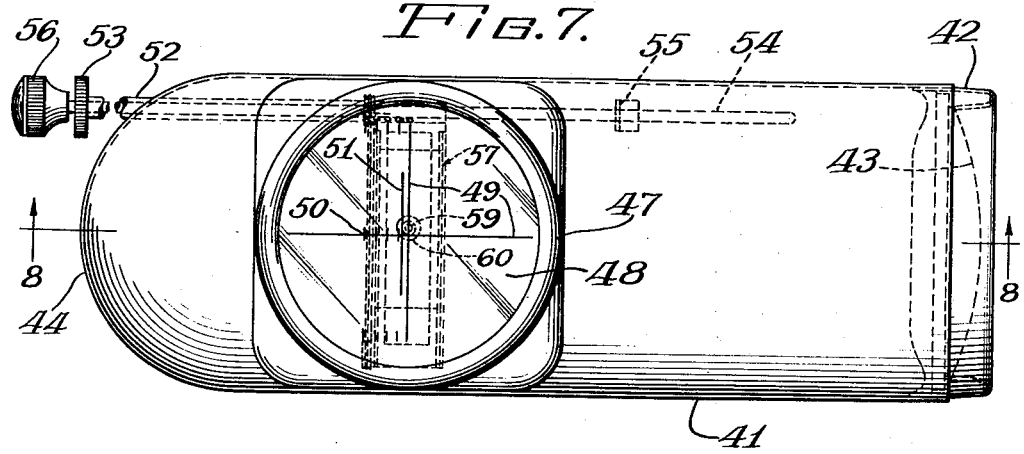
Fig. 7 is a top plan view of a modification of our headlight tester.
Figure 8:
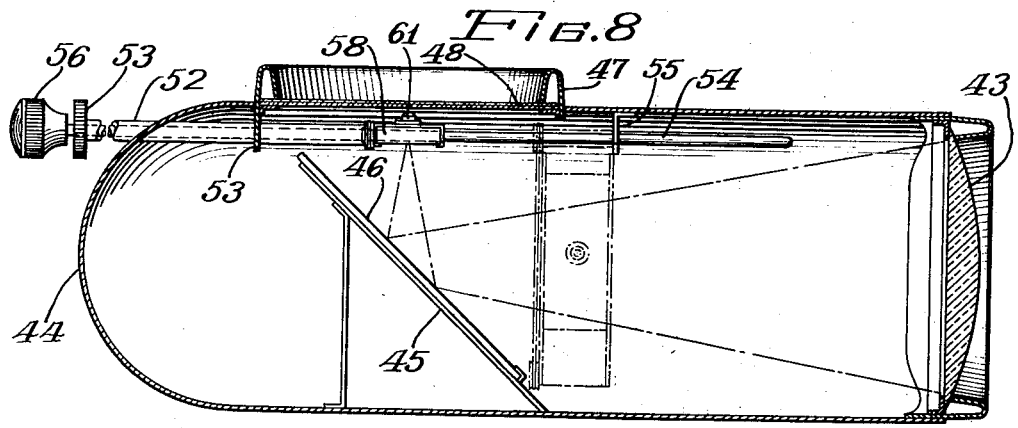
Fig. 8 is a longitudinal sectional view taken on line 8—8 of Fig. 7.

Referring particularly to Figs. 7 and 8, a modification of our invention is shown. In this form of our invention a headlight tester casing 41 is contemplated, said casing being similar to the casing hereinbefore described except as indicated hereinafter. The casing 41 carries a frame 42 at its front end which is adapted to support a lens 43 similar to lens 7, that is, both lenses are converging lenses. Unlike the casing 1, the casing 41 is closed at its rear end as indicated at 44.

Within the body of the casing and intermediate the length of the casing a frame 45 is positioned, said frame being disposed at an angle of 45° with respect to the longitudinal axis of the casing. A mirror 46 is supported upon the frame 45, the center of said mirror being disposed in substantial alignment with the optical center of the lens 43. The upper wall of casing 41 is provided with an opening defined by a frame 47, said frame being adapted to support a translucent screen 48. The screen 48 is similar to the screen 9 and is provided with cross hairs 49 and calibrations 50 together with the arbitrarily disposed line 51 which indicates the desired position of the axis of the beam from the headlight to be tested.

A tube 52 is rotatably positioned in the end wall 44 of the casing 41, said tube also being supported by lug 53 which comprises a portion of the frame 47. Exteriorly of the casing the tube 52 carries a knurled disc 53 similar to the disc 23. A rod 54 is slidably and rotatably positioned within the tube 52 and is supported by lug 55 adjacent one end thereof. Rod 54 carries knob 56 at the opposite end thereof exteriorly of the casing. A frame 57 identical with the frame 18 is carried upon rod 19 in a manner identical with the manner in which frame 18 is carried upon rod 19. The frame 57 carries a photoelectric cell 58, said photoelectric cell being identical to the photoelectric cell 32 and without further description it may be stated that the tube, rod and frame arrangement employed in the modification shown in Figs. 7 and 8 is identical with the tube, rod and frame arrangement hereinbefore described in conjunction with the device illustrated in Figs. 1 to 6 inclusive.

However, in manipulating the arrangement illustrated in Figs. 7 and 8 the photoelectric cell 58 is moved transversely with respect to the casing by means of the knurled disc 53 and is moved longitudinally with respect to the casing by means of rod 54, said rod being conveniently actuated by means of knob 56. Photoelectric cell 58 is provided with a central aperture 59 and its active face is covered by an opaque material except for a circular portion 60 which is concentric with the aperture 59 and of greater sectional area than said aperture. A short tubular member 61 similar to the tube 40 shown in Fig. 6 has its tubular opening in alignment with the aperture 59.

In employing the modification illustrated in Figs. 7 and 8 the headlight tester is disposed with respect to a headlight to be tested in the manner hereinbefore described, that is with the longitudinal axis of the casing 41, that is the optical axis of the lens 43 disposed coaxially with respect to the optical axis of the headlight to be tested. The light emanating from the headlight to be tested impinges upon the inclined surface of mirror 46 and is reflected upwardly thereby. By properly manipulating the knurled disc 53 and knob 56 the photoelectric cell 58 may be so oriented as to produce a maximum deflection upon a meter (not shown) similar to meter 35. When the maximum deflection is obtained the hot spot of the beam is substantially located at the aperture 59 through the photoelectric cell and a pencil of light passes through said aperture and through tube 61 and impinges upon the lower face of screen 48.

As has been hereinbefore described the hot spot is thus appraised electrically and is accurately located visually upon the screen 48. Depending upon the location of the hot spot upon the screen 48 proper adjustments can be made upon the headlight being tested until the hot spot is properly located along the line 51.

It would be apparent to those skilled in the art that many modifications of our invention may be made without departing from the spirit thereof and consequently we do not wish to be limited except as necessitated by the appended claims.

We claim as our invention:

1. A headlight testing device comprising in combination a frame, a converging lens carried upon said frame through which light from an adjacent headlight to be tested is passed, a translucent screen carried upon said frame in spaced relationship to said lens, a light sensitive device positioned between said lens and said screen adjacent said screen, means for universally positioning said light sensitive device in a plane substantially parallel to said screen and at substantially the axis of the beam of light from said lens, said light sensitive device being provided with a relatively restricted aperture through which a restricted pencil of a portion of the most intense light from said lens is channelled to impingement upon said screen in the form of an illuminated relatively restricted spot, and an electric meter connected to said light sensitive device responsive to that portion of the light impinging upon the light sensitive device and surrounding said pencil of light.

2. A headlight testing device comprising in combination a frame, a converging lens carried upon said frame through which light from a headlight to be tested is passed, a translucent screen carried upon said frame adjacent the plane of focus of said lens, a light sensitive device positioned adjacent said screen, means for moving said light sensitive device in two dimensions in a plane substantially normal to the path of said light for positioning said light sensitive device on substantially the axis of the beam of light from said lens, said light sensitive device being provided with a relatively restricted beam aperture through which a portion of the light from said lens passes to said screen, and an electric meter connected to said light sensitive device responsive to that portion of the light impinging upon the light sensitive device.

3. A headlight testing device comprising in combination a frame, a converging lens carried upon said frame through which light from a headlight to be tested is passed, a calibrated translucent screen carried upon said frame adjacent the plane of focus of said lens, a light sensitive device positioned adjacent said screen, adjustable means for universally positioning said light sensitive device in a plane substantially parallel to the plane of said screen and in the path of said light from said lens, said light sensitive device being provided with a relatively restricted aperture through which a pencil of light of restricted cross section from said lens passes to said screen, and an electric meter connected to said light sensitive device responsive to that portion of the light impinging upon the light sensitive device.

4. A headlight testing device comprising in combination a frame, a converging lens carried upon said frame through which light from a headlight to be tested is passed in the form of a concentrated beam, a translucent screen carried upon said frame adjacent the plane of focus of said lens and in a plane at substantially right angles to the axis of said beam, a light sensitive device positioned adjacent said screen, means for moving said light sensitive device in two dimensions in a plane substantially parallel to the plane of said screen and in the path of said beam from said lens, said light sensitive device being provided with a relatively restricted aperture through which the most intense portion of the light adjacent the axis of the beam from said lens passes to said screen, and an electric meter connected to said light sensitive device responsive to that portion of the beam impinging upon the light sensitive device symmetrically around said aperture.

5. A headlight testing device comprising in combination a frame, a converging lens carried upon said frame at one end thereof through which a light beam from a headlight to be tested is passed, a translucent screen carried upon said frame adjacent the opposite end thereof, with its center in alignment with the optical axis of said lens and with its plane at substantially right angles to the axis of said light beam, a light sensitive device positioned adjacent said screen and between said lens and screen, means for moving said light sensitive device universally in a plane substantially parallel to the plane of said screen and in the path of said light beam from said lens, said light sensitive device being of relatively large area provided with an aperture of relatively small area through which a portion of the light beam of restricted cross section from said lens passes to said screen, and an electric meter connected to said light sensitive device responsive to that portion of the light beam impinging upon the light sensitive device.

6. A headlight testing device comprising in combination a frame, a converging lens carried upon said frame at one end thereof through which a light beam from a headlight under test is passed, a translucent screen carried upon said frame with its plane at an angle to the plane of the lens, a light reflective device carried by said frame at an angle to the plane of the lens and the plane of said screen whereby the axis of the light beam from said lens is reflected toward said screen, a light sensitive device positioned adjacent said screen, means for positioning said light sensitive device universally in a plane at substantially right angles to the reflected axis of the light beam and in the path of the light from said reflective device, said light sensitive device being of relatively large area and being provided with an aperture of relatively small area through which a portion of the light beam of restricted cross-section from said reflective device passes to said screen, and an electric meter connected to said light sensitive device responsive to that portion of the light beam impinging upon the light sensitive device.

7. A headlight testing device comprising in combination a frame, a converging lens carried upon said frame through which light from an adjacent headlight to be tested is passed, a translucent screen carried upon said frame in spaced relationship to said lens, a light sensitive device positioned between said lens and said screen adjacent said screen, means for universally positioning said light sensitive device in a plane substantially parallel to said screen and at substantially the axis of the beam of light from said lens, said light sensitive device being provided with a relatively restricted aperture, means positioned in said relatively restricted aperture and extending from said light sensitive device and terminating adjacent said screen through which a restricted pencil of a portion of the most intense light from said lens is channelled to impingement upon said screen in the form of an illuminated relatively restricted spot, and an electric meter connected to said light sensitive device responsive to that portion of the light impinging upon the light sensitive device and surrounding said pencil of light.

HENRY E. HERMANN.
RAYMOND S. KRAUSE.

REFERENCES CITED

The following references are of record in the file of this patent:

UNITED STATES PATENTS

| Number | Name | Date |
|---|---|---|
| 1,991,928 | Hill | Feb. 19, 1935 |
| 2,128,543 | Squyer | Aug. 30, 1938 |
| 2,161,886 | Weaver | June 13, 1939 |
| 2,176,214 | Falge et al. | Oct. 17, 1939 |
| 2,210,882 | Carter | Aug. 13, 1940 |
| 2,261,741 | Mathieu | Nov. 4, 1941 |
| 2,288,807 | Kenworthy | July 7, 1942 |
| 2,477,235 | Broido | July 26, 1949 |

FOREIGN PATENTS

| Number | Country | Date |
|---|---|---|
| 702,213 | Germany | Feb. 1, 1941 |